United States Patent
Weber et al.

(10) Patent No.: US 11,765,256 B2
(45) Date of Patent: Sep. 19, 2023

(54) METHOD AND DEVICE FOR ANALYZING SERVICE-ORIENTED COMMUNICATION

(71) Applicant: Robert Bosch GmbH, Stuttgart (DE)

(72) Inventors: Andreas Weber, Weissach (DE); Janin Wolfinger, Birkenfeld (DE); Jens Gramm, Tuebingen (DE); Michael Herrmann, Düsseldorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/921,501

(22) Filed: Jul. 6, 2020

(65) Prior Publication Data

US 2021/0014341 A1  Jan. 14, 2021

(30) Foreign Application Priority Data

Jul. 10, 2019 (DE) .......................... 102019210225.5

(51) Int. Cl.
*H04L 69/22* (2022.01)
*H04L 49/351* (2022.01)
*H04L 69/04* (2022.01)
*H04L 69/16* (2022.01)

(52) U.S. Cl.
CPC ............ *H04L 69/22* (2013.01); *H04L 49/351* (2013.01); *H04L 69/04* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 8,909,415 B1* | 12/2014 | Hawley | H04W 4/38 701/32.3 |
| 9,430,646 B1* | 8/2016 | Mushtaq | H04L 63/1425 |
| 9,843,594 B1* | 12/2017 | Evans | H04L 63/1425 |
| 2002/0120746 A1* | 8/2002 | Patil | H04Q 3/0054 709/227 |
| 2015/0001427 A1* | 1/2015 | Zula | B60T 13/662 251/129.04 |
| 2016/0197944 A1* | 7/2016 | Allouche | H04L 63/1466 726/23 |
| 2017/0187729 A1* | 6/2017 | Moskowitz | G06Q 30/0601 |
| 2017/0295182 A1* | 10/2017 | Teshler | H04L 63/10 |
| 2018/0081671 A1* | 3/2018 | Naruse | B60R 16/0231 |
| 2018/0189103 A1* | 7/2018 | Teshler | G06F 9/5027 |
| 2019/0141070 A1* | 5/2019 | Tsurumi | B60R 1/00 |
| 2020/0021611 A1* | 1/2020 | Maeda | H04L 63/1466 |
| 2020/0205025 A1* | 6/2020 | Saha | H04L 45/42 |
| 2020/0389469 A1* | 12/2020 | Litichever | H04L 63/1425 |
| 2021/0075800 A1* | 3/2021 | Paraskevas | H04L 63/1441 |

\* cited by examiner

*Primary Examiner* — James A Edwards
(74) *Attorney, Agent, or Firm* — NORTON ROSE FULBRIGHT US LLP; Gerard Messina

(57) ABSTRACT

A device and method for analyzing service-oriented communication in a communications network. A data packet includes a header for service-oriented communication. It is analyzed for the data packet depending on information about at least two data fields of the header whether or not the data packet meets a criterion, the criterion defining a setpoint value for values from the at least two data fields permitted in the communications network or a combination of information from the at least two data fields permitted in the communications network.

19 Claims, 3 Drawing Sheets

METHOD AND DEVICE FOR ANALYZING SERVICE-ORIENTED COMMUNICATION

CROSS REFERENCE

The present application claims the benefit under 35 U.S.C. § 119 of German Patent Application No. DE 102019210225.5 filed on Jul. 10, 2019, which is expressly incorporated herein by reference in its entirety.

FIELD

The present invention is directed to a method and a device for analyzing service-oriented communication, in particular in a communications network of a vehicle, for example, an automotive Ethernet network.

BACKGROUND INFORMATION

Service-oriented communication uses service-oriented communications protocols and a service-oriented network architecture, which is implemented using service-oriented middleware.

An effective analysis of the service-oriented communication is desirable in particular for intrusion detection in the communications network.

SUMMARY

This is achieved in accordance with example embodiments of the present invention.

A method for analyzing service-oriented communication in a communications network provides that a data packet includes a header for a service-oriented communication, it being analyzed for the data packet depending on information about a data field, preferably about at least two data fields of the header, whether or not the data packet meets a criterion, the criterion defining a setpoint value for at least one value from the data field permitted in the communications network, preferably for a combination of the information from the at least two data fields permitted in the communications network. This enables an analysis of protocol headers of service-oriented communications protocols.

Preferably, the setpoint value defines a combination permitted in the communications network of identifiers identified in the data packet for a service user and a service provider. For example, service users or service providers who are not registered for the network are thus reliably identified.

The setpoint value preferably defines a combination permitted in the communications network of a service user identified in the data packet, in particular disclosed by a service ID, and a service provider identified in the data packet, in particular identified by a client ID. It is thus checked whether the communication between a service ID and a client ID is permitted.

It is preferably checked whether a field "protocol version," a field "message type," and/or a field "return code" from the data packet has a value permitted in the communications network. An anomaly may thus be defined specifically for the communications network.

It is preferably checked whether an error code is transmitted in a field "return code" of the data packet. An anomaly is thus reliably detectable.

It is preferably checked whether a length of the data packet corresponds to a length specified in a "length" field of the data packet and/or whether the data packet is longer or shorter than permitted in the communications network. An anomaly is thus particularly easily detectable.

It is preferably checked whether the fields "message type" and "return code" assume a permitted combination. These values are particularly informative for anomaly detection.

An anomaly or an intrusion in the communications network is preferably detected if the criterion is not met. Reports or countermeasures may thus be initiated.

It is preferably checked before an inspection of the criterion whether the data packet is part of a service-oriented communication, the inspection of the criterion being carried out if the data packet is part of a service-oriented communication and otherwise being omitted. This increases the efficiency.

A device for analyzing service-oriented communication in a communications network provides that the device includes an analysis unit, which is situated in a connecting element, in particular an automotive Ethernet switch, for connecting data lines in the communications network for transmitting data packets or is connected or connectable to this connecting element for communication, the analysis unit being designed to carry out the method.

Further advantageous specific embodiments result from the following description and the figures.

DETAILED DESCRIPTION OF EXAMPLE EMBODIMENTS

Figure 1:
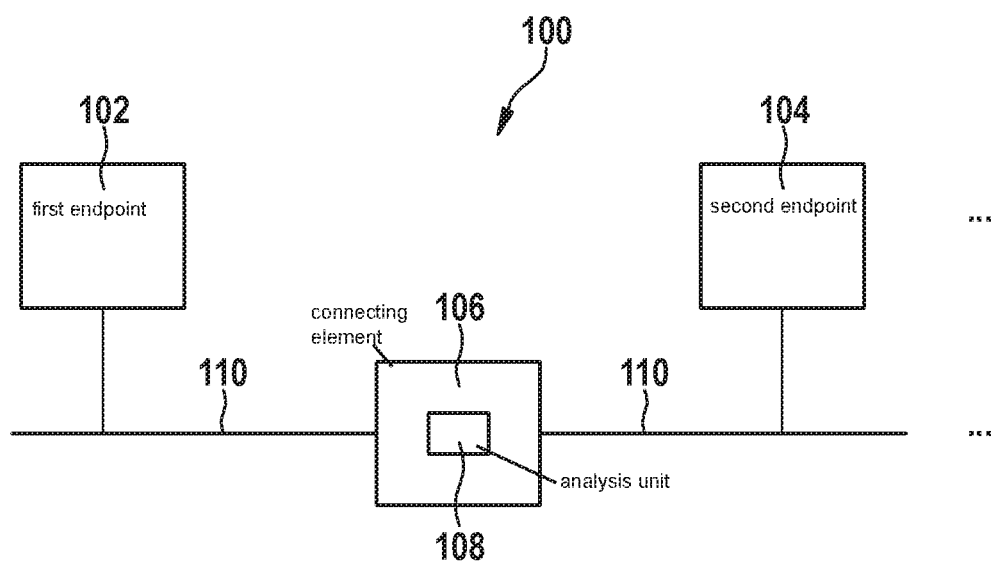
FIG. 1 shows a schematic representation of a communications network.

Differences of automotive networks from enterprise networks are to be taken into consideration to provide an NIDPS for an automotive network. These are, for example, their network structure, network dynamics, and their network nodes.

Network Structure:

An enterprise network typically follows a client-server model, in which there are a smaller number of dedicated server network nodes, which offer services to a typically higher number of client network nodes. Automotive network nodes are made up of ECUs, on which both server applications and client applications are executed.

Enterprise networks are generally significantly larger and more complex than automotive networks. The entirety of an enterprise network is typically substantially more segmented, physically or logically separated into various zones and subnetworks. ECUs in typical automotive networks are separated, if at all, by so-called "gateways" only into very few subnetworks or are logically separated on the Ethernet level via so-called "Virtual Local Area Networks" (VLANs).

Network Dynamics:

Enterprise and automotive networks differ in the dynamics, using which the network is changed and operated.

In enterprise networks, network nodes may be arbitrarily exchanged as desired. For changes in server network nodes, an adaptation may typically also be carried out in the configuration of the defense systems, for example, the NIDPS. In contrast, such adaptations are not possible in network nodes which are clients. This is because clients connect to the network from changing locations and are replaced frequently. Furthermore, it is not possible to predict precisely which applications are executed on the client.

ECUs in automotive networks are replaced very rarely, if at all, and are frequently also only replaced by an identical copy. It is therefore very improbable that something changes in the functionality of the network. In an automotive network, the network nodes are entirely known. The particular server and client applications running thereon are also well-defined and details about the network communication may be predefined.

In enterprise networks, nodes from the outside may establish the connections into a corporate network. In an automotive network, all communications nodes of the network are part of the internal vehicle network.

In enterprise networks, various users may typically use the same client. In ECUs of automotive networks, there are no users, but rather solely server and client applications which perform their service.

Network Nodes:

With respect to the resources, the network nodes of an enterprise network are generally multiple times more resource-intensive—for example, with respect to memory and performance—than ECUs of an automotive network.

With respect to the software, in enterprise networks the network nodes are usually equipped with widespread standard operating systems and standard software, for which security weaknesses are known. A focal point of NIDPS systems in enterprise networks is therefore to recognize in a signature-based manner when an attempt is made to utilize known security weaknesses. The network nodes in automotive networks are often equipped with less widespread software. A large part of the signatures from NIDPS systems for enterprise networks are not usable, and there are no larger databases about known weaknesses specific to automotive networks.

The fundamental object of an NIDPS, i.e., detecting and responding to anomalies in the network traffic, is identical in enterprise and automotive networks. However, it is apparent from the above-mentioned points that the fundamental functionality of an efficient NIDPS for automotive networks has to differ fundamentally from that of an NIDPS for enterprise networks. Due to these functional differences between enterprise networks and automotive networks, NIDPS for enterprise networks may not be used efficiently for automotive networks.

An NIDPS for an automotive network has to make use of the known and static network structure and also the significantly lower dynamics of the network users to be able to detect anomalies efficiently using limited resources.

Aspects of a service-oriented architecture and aspects of service-oriented protocols are described hereinafter. A service-oriented architecture (SOA) is an architectural pattern of information technology from the field of distributed systems to structure and use services of IT systems. The interaction typically runs between a service provider ("service") and a service user ("client") in the network according to the following pattern:
1) A service provider publishes or registers its service.
2) The software component which wishes to use a service searches for it in a list.
   If a matching service is found, it is possible to move on to the next step.
3) The using component receives a reference (address) from the list, under which it may access the service. The function call is linked to this address.
4) The service is called. Input parameters are transmitted to the service and output parameters are delivered as a response to the call.

Steps 1) through 3) are used to identify offered services with the aid of a central list and to find out how they may be addressed. This is also referred to as "service discovery." In some service-oriented protocols, "service discovery" is also implemented without a central list according to the so-called "publish/subscribe" pattern, in that components announce their services offered via multicast ("publish") and service users register for specific services, if necessary ("subscribe"). In general, identifiers exist to refer to individual service providers and service users in data packets of the service-oriented communication. These identifiers are referred to hereafter by "service ID" for service providers or "client ID" for service users. In specific service-oriented communications protocols, other designations may also be used for this purpose. In general, identifiers also exist to identify a message type of a data packet. This identifier is identified hereinafter by "message type." For example, a request of a service user to a service provider is identified by the message type "request" and the response of a service provider to a service user is identified by the message type "response."

Pieces of middleware which implement a service-oriented communication infrastructure are, for example, scalable service-oriented middleware over IP (SOME/IP) or data distribution service (DDS). Both are used in the automotive field.

These pieces of middleware define corresponding communications protocols, which specify the way in which data are exchanged within the service-oriented middleware. For SOME/IP, this is generally referred to here as the SOME/IP protocol.

FIG. 1 shows a schematic representation of a communications network 100. Communications network 100 includes a first endpoint 102 of a communications relationship and a second endpoint 104 of a communications relationship. First endpoint 102 and second endpoint 104 are connected via a connecting element 106, in particular an automotive Ethernet switch. In the example, data are exchanged in the communications relationship via frames. Connecting element 106 is designed to receive a frame and to relay pieces of information from the frame. Communications network 100 is an automotive Ethernet network in the example. The information from the frame is in the example information from the data link layer of the OSI model. The endpoints may be control units in a vehicle, which communicate via the automotive Ethernet network. Communications network 100 includes an analysis unit 108. Analysis unit 108 includes, for example, an NIDPS. Analysis unit 108 is situated, for example, in the automotive Ethernet switch. In FIG. 1, the analysis is represented in a connecting element 106 of the communication. The analysis may alternatively or additionally also take place on an endpoint of the communication, for example, first endpoint 102 or second endpoint 104. A part of analysis unit 108 or analysis unit 108 as a whole may also be situated outside connecting element 106 and may be connected or connectable to communications network 100 or connecting element 106 via a separate interface or via communications network 100. In the example, data lines 110 for the connection are situated in communications network 100. Wireless connections may also be at least partially provided.

First endpoint 102 and second endpoint 104 are registered endpoints in the example. The registered endpoints are stored, for example, in a table in analysis unit 108. The table may be stored statically depending on a design of communications network 100 or a definition of service providers and service users available in the vehicle. A database may also be used for this purpose. The registered endpoints may also be learned in operation of communications network 100 and stored. First endpoint 102 and second endpoint 104 may be both transmitter endpoint and receiver endpoint in the service-oriented communication. First endpoint 102 and second endpoint 104 may be both service providers and also service users in the service-oriented communication. A registered combination or multiple registered combinations of endpoints associated with one another for the service-oriented communication may also be provided or stored. A direction for a service-oriented communication for such a combination or for individual registered endpoints may also be predefined or stored.

Figure 2:
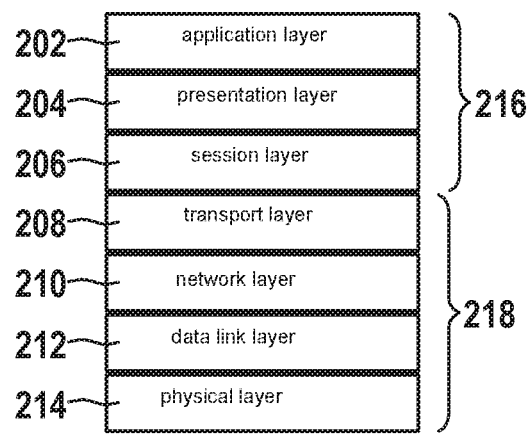
FIG. 2 shows a schematic representation of protocol layers for the communications network.

Protocol layers for the communications network according to the OSI model are shown in FIG. 2. According to the OSI model, a presentation layer 204, a session layer 206, a transport layer 208, a network layer 210, a data link layer 212, and a physical layer 214 are situated under an application layer 202.

The protocols referred to hereinafter as service-oriented communications protocols are summarized, in contrast, as applications 216. Examples of applications 216 are HTTP, UDS, FTP, SMTP, POP, Telnet, DHCP, OPC UA, SOCKS, SOME/IP, DDS. The other protocols are referred to as underlying protocols 218. Examples of underlying protocols 218 are TCP, UDP, SCTP, IP (IPv4, IPv6), ICMP, Ethernet, Token Bus, Token Ring, FDDI.

A functionality is described on the basis of the example of SOME/IP in the following description. This functionality is applicable accordingly to other service-oriented communications protocols, such as DDS.

SOME/IP defines, in addition to the actual communications protocol, a separate mechanism for service discovery, i.e., to find and manage services at the runtime. SOME/IP specifies for this purpose, in addition to the SOME/IP protocol, the SOME/IP service discovery (SOME/IP-SD) protocol. It is transmitted via SOME/IP-SD, for example, which of the endpoints a SOME/IP service or a SOME/IP client uses. A SOME/IP client may thus find a SOME/IP service and vice versa. A communication between SOME/IP service and SOME/IP client and vice versa is thus possible.

Figure 3:
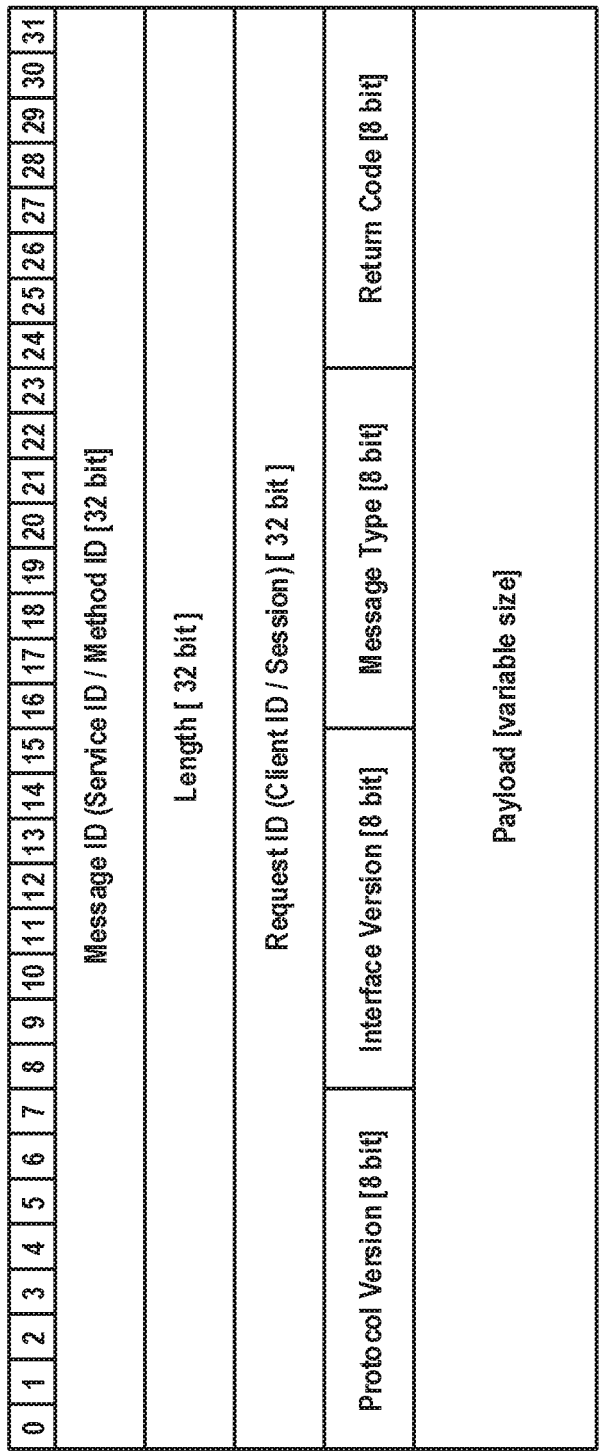
FIG. 3 shows a SOME/IP header.

A SOME/IP header is shown in FIG. 3.

The checking of the functionality of a piece of service-oriented middleware based on SOME/IP takes place as described hereinafter using pieces of information from protocols which typically underlie the protocol implementing the service-oriented communication in communications network 100.

In a data packet of service-oriented communication, for example, so-called "endpoints" of the communication are identified in the headers of the underlying protocol layers. They are identified, for example, on the basis of their MAC address, IP address, or port number.

The endpoints of the communications relationships are preferably defined statically and beforehand in a specific vehicle, whose communication is analyzed. In this case, the following information or a subset thereof is provided to the NIDPS as "system knowledge":

Ports of the transport layer which are used for a service-oriented communication.

Registered endpoints which are used by service providers ("services") and which are used by service users ("clients").

Registered identifiers for service providers—"service ID"—and for service users—"client ID."

For each "service ID," a list of registered endpoints which may be offered by the service identified by "service ID."

For each "client ID," a list of registered endpoints which may claim the service identified by "client ID."

Registered combinations of service users and service providers: registered combinations of "client ID" and "service ID" and/or registered combinations of endpoints, i.e., which endpoints service user (client) may be for which service provider (service).

Figure 4:
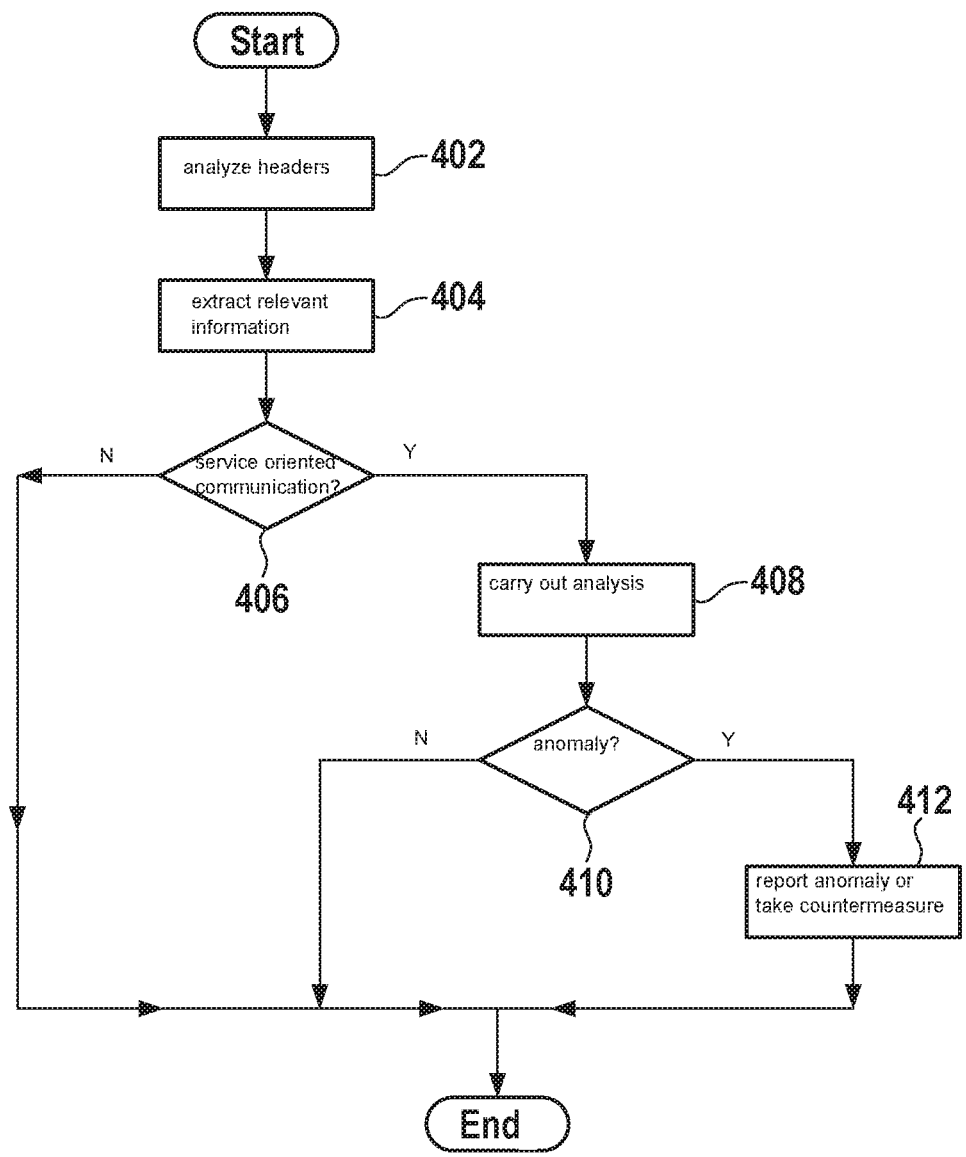
FIG. 4 shows steps in a method for analyzing service-oriented communication in the communications network in accordance with an example embodiment of the present invention.

A method for analyzing anomaly detection in accordance with an example embodiment of the present invention is described on the basis of FIG. 4.

In general, identifiers exist to refer to individual service providers and service users in data packets of the service-oriented communication. An identification of a service which is offered in the service-oriented communication is referred to hereafter for service providers by "service ID." An identification of a client, i.e., a service user of a service which is offered in the service-oriented communication is referred to hereafter for service users by "client ID." These designations may differ in specific service-oriented communications protocols. In general, identifiers also exist to identify the message type of a data packet. We refer to these identifiers hereinafter as "message type." For example, a request of a service user to a service provider is identified by the message type "request" and the response of a service provider to a service user is identified by the message type "response."

Typically, the headers of a service-oriented communications protocol generally also contain further pieces of information as follows:

data field "length" to identify the length of the payload data, data field "protocol version" to identify the protocol version, data field "return code" to identify a return value.

Depending on the specific protocol, the header may contain further data fields.

Scalable service-oriented middleware over IP, SOME/IP or data distribution service (DDS), are both pieces of middleware which implement a service-oriented communications infrastructure according to the so-called "publish/subscribe" pattern and are used in the automotive field.

This also includes that these pieces of middleware define corresponding communications protocols which specify the way in which data are exchanged within the service-oriented pieces of middleware. For SOME/IP this is generally referred to here as the SOME/IP protocol.

In the example method, the following fields are used in the header of the protocol, in particular for SOME/IP:

An identifier to identify a service provider (service), for example, the SOME/IP "service ID" and the SOME/IP "method ID."

An identifier to identify the service user, for example, the SOME/IP "client ID."

An identifier to identify a specific service call, for example, the SOME/IP "session ID."

Furthermore, there are generally also further data fields "length," "protocol version," "interface version," "message type," and "return code."

The example method is used for analyzing protocol headers of service-oriented communications protocols using stateless filter methods. A main aspect is the analysis of protocol headers of service-oriented communications protocols which are used in automotive Ethernet networks.

It is in the specific nature of contemporary automotive networks that they are static and are defined beforehand. Therefore, the following pieces of information may be provided to the NIDPS as "system knowledge" for a specific network:

Permitted service providers (services), i.e., permitted values for "service ID."
Permitted service users (clients), i.e., permitted values for "client ID."
Permitted combinations of which service users (client) may use which service providers (service).
Permitted values for data fields of the header, among other things
  i) values for "protocol version" field, values for "message type" field,
  ii values for "return code" field,
  iii) values for "length" field.
Permitted combinations for values of data fields, among other things
  a) Combinations of values for "message type and "return code" fields, since the "return code" field may only assume specific values for a specific value of the "message type" field.
  b) Combinations of values for "client ID" and "message type," i.e., specific message types which a service user may send or receive.
  c) Combinations of values for "client ID" and "return code," i.e., specific return values which a service user may send or receive.
  d) Combinations of values for "service ID" and "message type," i.e., specific message types which a service provider may send or receive.
  e) Combinations of values for "service ID" and "return code," i.e., specific return values which a service user may send or receive.

The example method starts, for example, when the NIDPS receives a data packet. The headers contained in the data packet are preferably analyzed in succession.

The anomaly detection functions as follows.

As soon as the NIDPS receives a data packet, in a step 402, the headers contained therein are analyzed successively or in any arbitrary other sequence. Not all headers of a data packet have to be analyzed.

The NIDPS recognizes the employed protocol of the application layer on the basis of the port numbers of the transport protocol, typically TCP or UDP.

Depending on the employed protocol, in a step 404, an anomaly detection for the service-oriented protocol is started.

In the example of SOME/IP, in step 404, the NIDPS extracts relevant pieces of information from the SOME/IP header shown in FIG. 3.

From this SOME/IP header, the NIDPS extracts the identifier of network users, i.e., SOME/IP "service ID," SOME/IP "method ID," SOME/IP "message ID," and SOME/IP "client ID."

Furthermore, the values for the further data fields "length," "protocol version," "interface version," "message type," and "return code" may be extracted.

In a step 406, it is checked whether the data packet is part of a service-oriented communication. If the data packet is part of a service-oriented communication, a step 408 is carried out. Otherwise, the method is ended.

If the data packet is part of a service-oriented communication, i.e., for example, for SOME/IP or SOME/IP-SD, in step 408, the NIDPS carries out the following analyses, or a subset thereof.

The NIDPS checks whether the identifiers identified in the data packet for service user and service provider are permitted in the network.
Specifically:
  i) The NIDPS checks whether the service provider identified in the data packet, identified by a "service ID," is registered for the network.
  ii) The NIDPS checks whether the service provider identified in the data packet, identified by a "client ID," is registered for the network.

For SOME/IP this means specifically the check as to whether an identified SOME/IP "service ID" or SOME/IP "client ID" is registered for the network.

The NIDPS checks whether the service user identified in the data packet, identified by a "service ID," and service provider, identified by a "client ID," form a permitted combination.

For SOME/IP it may be checked whether communication is permitted between a SOME/IP "service ID" and a SOME/IP "client ID" and may thus appear in a header.

The NIDPS checks the values of further header data fields, for example,
  i) The NIDPS checks whether the fields "protocol version," "message type," and "return code" assume permitted values.
  ii) The NIDPS checks whether an error code is transmitted in the field "return code."
  iii) The NIDPS checks whether the length of the data packet coincides with the length specified in the "length" field.
  iv) The NIDPS checks whether a data packet is longer or shorter than permitted.

The NIDPS checks combinations of values of header data fields, for example,
  i) The NIDPS checks whether the fields "message type" and "return code" assume a permitted combination. The background of this check is that only specific return values are permitted for specific message types.

For SOME/IP, for example, the knowledge about SOME/IP services may be used. Specifically, it is possible to know beforehand which type of method an SOME/IP "message ID" implements. Possible methods are so-called "remote procedure call (RPC) or so-called "fire and forget" methods. Some message types and some "return code" values are possible for RPCs and some are only possible for fire and forget methods.

In a step 410, it is checked whether the NIDPS has established an anomaly in one of the checks. If an anomaly is established in one of the checks, a step 412 is carried out. Otherwise, the method ends.

In step 412, the anomaly is reported or a countermeasure is taken. The method subsequently ends.

The described steps may be carried out in this or a different sequence. All or the same steps do not have to be carried out for every packet.

Using the method, the network traffic at the existing Ethernet ports may be analyzed in an automotive Ethernet network. Depending on the analysis, anomalies which are caused by an intruder in the network may be identified. This analysis runs in the example at the automotive Ethernet switch, at the hardware ports or switch ports of which the data packets arrive. The analysis may also take place at any other user on the automotive Ethernet network in a vehicle. It may be provided that anomalies in the network traffic are identified in the automotive network and these intrusions are reacted to.

The following is achieved due to the use of pieces of information of the protocols which, according to the OSI model, underlie the protocols which implement a service-oriented piece of middleware:

- Ensuring that data packets are only sent by permitted network users. Network users may be identified, for example, by "endpoints." The endpoints are identified, for example, by IP address, port number, and information of which transport protocol is used.
- Checking between which network users data packets are exchanged within the service-oriented communication. This is advantageous in particular if this information is not necessarily available from the data packet of a service-oriented communications protocol.
- Checking that only permitted endpoints may communicate with network users during the finding phase, the so-called "service discovery," of a service-oriented communications protocol.

What is claimed is:

1. A method for analyzing service-oriented communication in a communications network, comprising the following steps:
   analyzing a data packet, and determining, based on information about a data field of a header included in the data packet, whether or not the data packet meets a criterion, the criterion defining a setpoint value for at least one value from the data field permitted in the communications network, the communications network being an automotive communications network in a vehicle;
   wherein the header is a header for service-oriented communication;
   wherein the setpoint value defines a combination of values, permitted in the communications network, of at least two different fields of the header of the data packet;
   wherein an anomaly or an intrusion in the communications network is detected when the criterion is not met by the data packet;
   wherein the combination of values defines a permitted combination of identifiers in the header of the data packet which identify a service user and a service provider, the service user being a user of a service, and the service provider being a provider of the service;
   wherein the method further comprises performing a countermeasure in response to detecting the anomaly or the intrusion in the communications network; and
   wherein the determining of whether or not the data packet meets the criterion is based on a table or a database, the table or the database storing identifications of permitted service providers, identifications of permitted service users, and permitted combinations of which service users may use which service providers.

2. The method as recited in claim 1, wherein the combination of values permitted in the communications network is a combination of the service provider identified in the header of the data packet by a service ID, and the service user identified in the header of the data packet identified by a client ID.

3. The method as recited in claim 1, wherein the determining includes checking whether a field "protocol version" from the data packet and/or a field "message type" from the data packet and/or a field "return code" from the data packet, has a value permitted in the communications network.

4. The method as recited in claim 3, wherein the determining includes checking whether the fields "message type" and "return code" assume a permitted combination.

5. The method as recited in claim 1, wherein the determining includes checking whether an error code is transmitted in a field "return code" of the data packet.

6. The method as recited in claim 1, wherein the determining includes checking whether a length of the data packet coincides with a length specified in a "length" field of the data packet and/or whether the data packet is longer or shorter than permitted in the communications network.

7. The method is recited in claim 1, wherein before an inspection of the criterion, it is checked whether the data packet is part of a service-oriented communication, the inspection of the criterion being carried out only if the data packet is part of a service-oriented communication.

8. The method as recited in claim 1, wherein the countermeasure includes prohibiting the data packet from being sent to a network user of the communications network.

9. A device for analyzing service-oriented communication in a communications network, the device comprising:
   an analysis unit which is: (i) situated in a connecting element for connecting data lines in the communications network for transmitting data packets, or (ii) connected or connectable to the connecting element for communication, the analysis unit configured to:
   analyze a data packet, and determine, based on information about a data field of a header included in the data packet, whether or not the data packet meets a criterion, the criterion defining a setpoint value for at least one value from the data field permitted in the communications network, the communications network being an automotive communications network in a vehicle;
   wherein the setpoint value defines a combination of values, permitted in the communications network, of at least two different fields of the data packet;
   wherein an anomaly or an intrusion in the communications network is detected when the criterion is not met by the data packet;
   wherein the header is a header for service-oriented communication;
   wherein the combination of values defines a permitted combination of identifiers in the header of the data packet which identify a service user and a service provider, the service user being a user of a service, and the service provider being a provider of the service;
   wherein the analysis unit is configured to initiate a countermeasure in response to detecting the anomaly or the intrusion in the communications network; and
   wherein the determination of whether or not the data packet meets the criterion is based on a table or a database, the table or the database storing identifications of permitted service providers, identifications of permitted service users, and permitted combinations of which service users may use which service providers.

10. The device as recited in claim 9, wherein the connecting element is an automotive Ethernet switch.

11. The device as recited in claim 9, wherein the combination of values permitted in the communications network is a combination of the service provider identified in the header of the data packet by a service ID, and the service user identified in the header of the data packet identified by a client ID.

12. The device as recited in claim 9, wherein the combination of values defines a permitted combination of values of a message type field in the header of the data packet and a return code field of the header of the data packet.

13. The device as recited in claim 9, wherein the countermeasure includes prohibiting the data packet to a network user of the communications network.

14. A non-transitory computer-readable storage medium on which is stored a computer program for analyzing service-oriented communication in a communications network, the computer program, when executed by a computer, causing the computer to perform the following steps:
   analyzing a data packet, and determining, based on information about a data field of a header included in the data packet, whether or not the data packet meets a criterion, the criterion defining a setpoint value for at least one value from the data field permitted in the communications network, the communications network being an automotive communications network in a vehicle;
   wherein the header is a header for service-oriented communication;
   wherein the setpoint value defines a combination of values, permitted in the communications network, of at least two different fields of the data packet;
   wherein an anomaly or an intrusion in the communications network is detected when the criterion is not met by the data packet;
   wherein the combination of values defines a permitted combination of identifiers in the header of the data packet which identify a service user and a service provider, the service user being a user of a service, and the service provider being a provider of the service; and
   wherein the method further comprises performing a countermeasure in response to detecting the anomaly or the intrusion in the communications network; and
   wherein the determination of whether or not the data packet meets the criterion is based on a table or a database, the table or the database storing identifications of permitted service providers, identifications of permitted service users, and permitted combinations of which service users may use which service providers.

15. The non-transitory computer-readable storage medium as recited in claim 14, wherein the combination of values permitted in the communications network is a combination of the service provider identified in the header of the data packet by a service ID, and the service user identified in the header of the data packet identified by a client ID.

16. The non-transitory computer-readable storage medium as recited in claim 14, wherein the combination of values defines a permitted combination of values of a message type field in the header of the data packet and a return code field of the header of the data packet.

17. The non-transitory computer-readable storage medium as recited in claim 14, wherein the countermeasure includes prohibiting the data packet to a network user of the communications network.

18. A method for analyzing service-oriented communication in a communications network, the method comprising the following steps:
   analyzing a data packet, and determining, based on information about a data field of a header included in the data packet, whether or not the data packet meets a criterion, the criterion defining a setpoint value for at least one value from the data field permitted in the communications network, the communications network being an automotive communications network in a vehicle;
   wherein the header is a header for service-oriented communication;
   wherein the setpoint value defines a combination of values, permitted in the communications network, of at least two different fields of the header of the data packet;
   wherein an anomaly or an intrusion in the communications network is detected when the criterion is not met by the data packet;
   wherein the combination of values defines a permitted combination of values of a message type field in the header of the data packet and a return code field of the header of the data packet; and
   wherein the method further comprises performing a countermeasure in response to detecting the anomaly or the intrusion in the communications network; and
   wherein the determining of whether or not the data packet meets the criterion is based on a table or a database, the table or the database storing values of permitted message types, values of permitted return codes, and permitted combinations of message types and return codes.

19. The method as recited in claim 18, wherein the countermeasure includes prohibiting the data packet from being sent to a network user of the communications network.

\* \* \* \* \*